(12) United States Patent
Kim et al.

(10) Patent No.: US 12,461,709 B2
(45) Date of Patent: Nov. 4, 2025

(54) ELECTRONIC APPARATUS AND CONTROL METHOD THEREFOR

(71) Applicant: SAMSUNG ELECTRONICS CO., LTD., Suwon-si (KR)

(72) Inventors: Jiyoun Kim, Suwon-si (KR); Saebyuk Sheen, Suwon-si (KR); Jaehan Lee, Suwon-si (KR); Nari Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 85 days.

(21) Appl. No.: 18/367,345

(22) Filed: Sep. 12, 2023

(65) Prior Publication Data

US 2023/0418553 A1  Dec. 28, 2023

Related U.S. Application Data

(63) Continuation of application No. PCT/KR2022/003480, filed on Mar. 11, 2022.

(30) Foreign Application Priority Data

Mar. 12, 2021  (KR) .................. 10-2021-0032930

(51) Int. Cl.
*G06F 16/00* (2019.01)
*G06F 3/16* (2006.01)
(Continued)

(52) U.S. Cl.
CPC .............. *G06F 3/165* (2013.01); *G06V 20/70* (2022.01); *G11B 27/036* (2013.01);
(Continued)

(58) Field of Classification Search
CPC .......... G06F 16/00; G06F 16/60; G06F 16/70; G06F 16/638; G06F 16/68; G06F 3/0482;
(Continued)

(56) References Cited

U.S. PATENT DOCUMENTS 9,161,006 B1 * 10/2015 Wang ...................... G06T 11/40
2010/0254676 A1  10/2010 Ebato
(Continued)

FOREIGN PATENT DOCUMENTS

CN  104199876 A  12/2014
EP  3758358 A1  12/2020
(Continued)

OTHER PUBLICATIONS

International Search Report mailed Jun. 14, 2022 for PCT/KR2022/003480.
(Continued)

*Primary Examiner* — Daquan Zhao
(74) *Attorney, Agent, or Firm* — CANTOR COLBURN LLP

(57) ABSTRACT

An electronic apparatus includes: a microphone; a camera; a display; a speaker; and a processor operatively connected to the camera, the display, and the speaker, where the processor displays, on the display, a live view image obtained through the camera, when a camera application is executed; obtain a characteristic text for the live view image based on ae piece of object information included in the live view image, displays the characteristic text together with the live view image, identifies a sound source including metadata which matches the characteristic text, from among sound sources; displays information about the sound source together with the live view image, and when a user manipulation for capturing a moving image is input, outputs a first sound source from among the sound source through the speaker and capture a moving image through the microphone and the camera.

20 Claims, 14 Drawing Sheets

(51) Int. Cl.
  *G06F 16/60* (2019.01)
  *G06V 20/70* (2022.01)
  *G11B 27/036* (2006.01)
  *H04N 23/63* (2023.01)
  *H04R 1/02* (2006.01)
  *H04R 3/00* (2006.01)
  *G06F 3/0482* (2013.01)
  *G06F 16/70* (2019.01)

(52) U.S. Cl.
  CPC .......... *H04N 23/632* (2023.01); *H04R 1/028* (2013.01); *H04R 3/00* (2013.01); *G06F 3/0482* (2013.01); *H04R 2430/01* (2013.01); *H04R 2499/11* (2013.01); *H04R 2499/15* (2013.01)

(58) Field of Classification Search
  CPC .... G06F 3/165; G06Q 10/10; G06Q 30/0276; G06Q 50/01; G06V 20/70; G11B 27/036; H04N 23/61; H04N 23/632; H04N 23/633; H04N 5/772; H04R 1/028; H04R 2430/01; H04R 2499/11; H04R 2499/15; H04R 3/00
  USPC .................. 386/239, 248, 278, 285, 282
  See application file for complete search history.

(56) References Cited

U.S. PATENT DOCUMENTS

| | | | |
|---|---|---|---|
| 2016/0027209 A1* | 1/2016 | Demirli | G06T 19/003 345/419 |
| 2018/0173701 A1 | 6/2018 | Kim et al. | |
| 2019/0075343 A1* | 3/2019 | Cohen | G11B 27/031 |
| 2020/0019562 A1 | 1/2020 | Imbruce et al. | |
| 2020/0265614 A1 | 8/2020 | Jung et al. | |
| 2021/0098110 A1* | 4/2021 | Periyasamy | G16H 20/70 |

FOREIGN PATENT DOCUMENTS

| | | |
|---|---|---|
| KR | 20050079071 A | 8/2005 |
| KR | 20080000100 A | 1/2008 |
| KR | 20140126556 A | 10/2014 |
| KR | 20160031226 A | 3/2016 |
| KR | 20170130729 A | 11/2017 |
| KR | 20190020281 A | 2/2019 |
| KR | 20190040822 A | 4/2019 |
| KR | 20190108027 A | 9/2019 |
| KR | 20200000104 A | 1/2020 |
| KR | 20200038688 A | 4/2020 |
| KR | 20200077176 A | 6/2020 |
| KR | 102161080 B1 | 9/2020 |

OTHER PUBLICATIONS

The extended European search report for EP Application No. 22767567.5 mailed on Jul. 30, 2024.
Korean Office Action for KR Application No. 10-2021-0032930 mailed on Jun. 5, 2025.

\* cited by examiner

ELECTRONIC APPARATUS AND CONTROL METHOD THEREFOR

This application is a continuation application, claiming priority under § 365(c), to International application No. PCT/KR2022/003480, filed on Mar. 11, 2022, which is based on and claims the benefit of Korean Patent Application No. 10-2021-0032930, filed on Mar. 12, 2021, in the Korean Intellectual Property Office, the disclosure of which is incorporated by reference herein in its entirety.

BACKGROUND

1. Field

Various embodiments of the disclosure relate to an electronic device for providing a sound source based on a live view image and a method for controlling the electronic device.

2. Description of the Related Art

Recently, electronic devices are providing more diversified services and additional functions. There are being developed various applications executable on electronic devices to meet diverse demand of users and to improve the utility of electronic devices.

A camera application is widely used by users, and the user may take a selfie or background or record a video using the camera equipped in the electronic device.

SUMMARY

Conventionally, insertion of a background sound in a video may be performed by taking a video, downloading a sound source, and inserting the sound source into the video using a separate application.

In this case, the user may search for and download the sound source while having information about the sound source to be inserted into the video. Thus, the sound source that may be utilized by the user is limited.

The disclosure provides an electronic device capable of taking a video with a sound source selected based on a live view image provided for video taking and a method for controlling the same.

According to various embodiments, an electronic device includes a microphone, a camera, a display, a speaker, and at least one processor operatively connected to the camera, the display, and the speaker. In such embodiments, the at least one processor is configured to: if a camera application is executed, display a live view image obtained through the camera on the display, obtain at least one feature text for the live view image based on at least one piece of object information included in the live view image, display the at least one feature text with the live view image, identify at least one sound source including metadata, which matches the at least one feature text, among a plurality of sound sources, display information about the at least one sound source with the live view image, and if a user manipulation for video taking is input, output a first sound source among the at least one sound source through the speaker and take a video through the microphone and the camera.

According to various embodiments, a method for controlling an electronic device includes, if a camera application is executed, displaying a live view image obtained through a camera on a display, obtaining at least one feature text for the live view image based on at least one piece of object information included in the live view image, displaying the at least one feature text with the live view image, identifying at least one sound source including metadata, which matches the at least one feature text, among a plurality of sound sources, displaying information about the at least one sound source with the live view image, and if a user manipulation for video taking is input, outputting a first sound source among the at least one sound source through a speaker and taking a video through a microphone and the camera.

An electronic device according to various embodiments of the disclosure may effectively or efficiently insert a sound source suitable for a video by taking the video with the output of the sound source.

Further, an electronic device according to various embodiments of the disclosure may recommend a sound source suitable for a live view image, allowing the user to effectively or efficiently utilize various sound sources.

DETAILED DESCRIPTION

Figure 1:
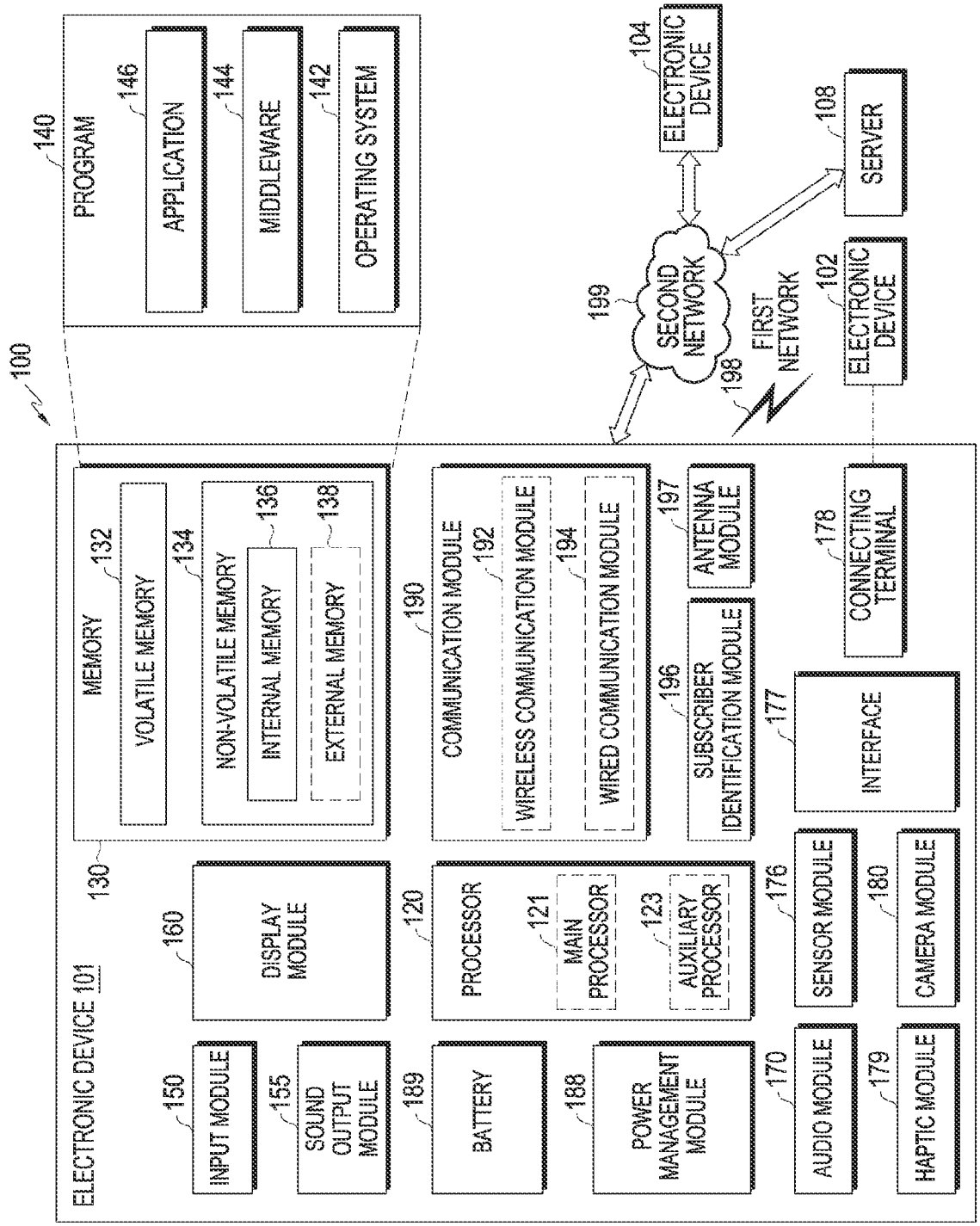
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR)

sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
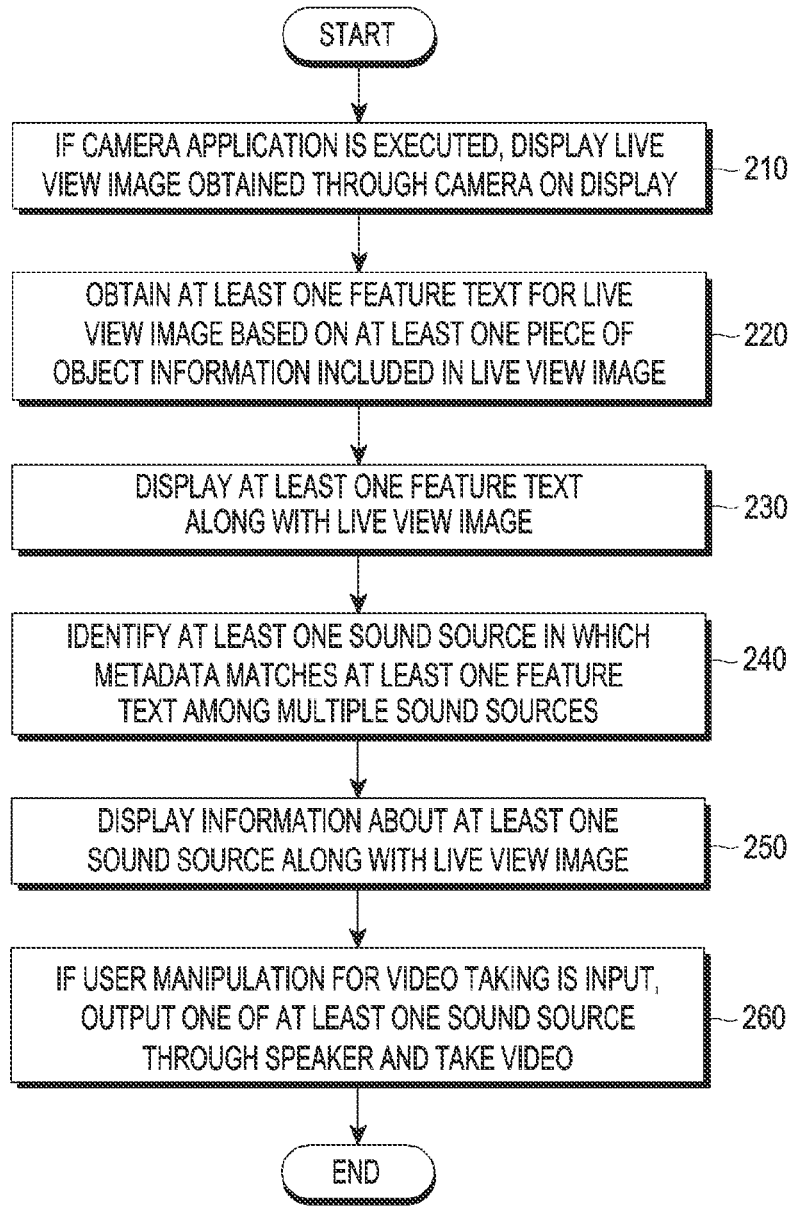
FIG. 2 is a view illustrating a video recording operation of an electronic device according to various embodiments.

FIG. 2 is a view illustrating a video recording operation of an electronic device according to various embodiments.

According to various embodiments, referring to FIG. 2, in operation 210, an electronic device (e.g., the electronic device 101 of FIG. 1), if a camera application is executed, may display a live view image obtained through a camera (e.g., the camera module 180 of FIG. 1) through a display (e.g., the display module 160 of FIG. 1).

According to various embodiments, the live view image is to previously show the image to be taken through the display. Before being taken, the live view image is not stored and, after a user manipulation input for taking, an image corresponding to the live view image may be stored.

Figure 3A:
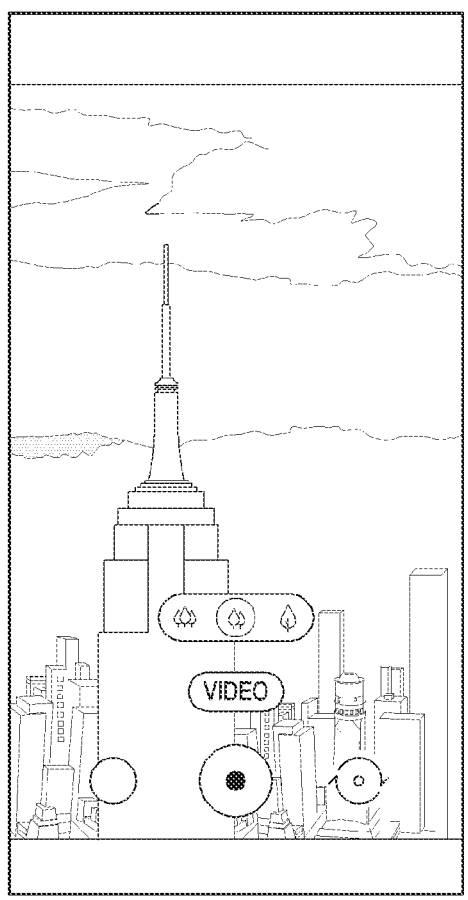
FIG. 3A is a view illustrating a live view image according to various embodiments.

FIG. 3A is a view illustrating a live view image according to various embodiments.

According to various embodiments, referring to FIG. 3A, if a camera application is executed, an electronic device (e.g., the electronic device 101 or the processor 120 of FIG. 1) may display a live view image on a display (e.g., the display module 160 of FIG. 1).

For example, the electronic device may display a live view image of an image obtained through a camera (e.g., the camera module 180 of FIG. 1) on the display, and may display a user interface for taking an image together with the live view image. For example, the user interface for taking an image may include a user interface for taking a still image, a user interface for taking a video, and a user interface for switching to a front camera or a rear camera.

According to various embodiments, referring back to FIG. 2, in operation 220, the electronic device may obtain at least one feature text for the live view image based on the at least one piece of object information included in the live view image.

According to various embodiments, the electronic device may obtain at least one piece of object information included in the live view image. For example, the electronic device may obtain at least one piece of object information included in the live view image by analyzing the live view image.

According to various embodiments, the electronic device may obtain object information by analyzing the live view image as shown in Table 1 below. For example, the electronic device may obtain whether a person, face, animal, or scenery is included, as the object information by analyzing the live view.

TABLE 1

| Category | Definition | Remark |
| --- | --- | --- |
| 1 Face | Face-focused photo close to selfie, big close-up, close-up, bust | opposite gender icon indications |
| 2 Baby | | |
| 3 Person | From half body to whole body, Waist, Knee, Full | |
| 4 Dogs | | The size of the animal area should be at least 25% of the image |
| 5 Cats | | The size of the animal area should be at least 25% of the image |
| 6 Food(vegetable, fruits) | The food is on the plate. | However, bird view for a few foods, such as table setting, beverages, etc. are excluded. |
| 7 People | Group of 2 or more or Extreme long | |
| 8 Beach | Sandy beach, beach. If ambiguous, it is classified as scenery | |
| 9 Sky | Where the sky is at least 80%; | |
| 10 Mountain | Snowy mountain, snow on the roof | If there is no morphological feature, it is classified as scenery |

TABLE 1-continued

| Category | Definition | Remark |
|---|---|---|
| 11 Sunset | with sun | |
| 12 Sunrise | with sun | |
| 13 City | Where a water stream is recognized; | If ambiguous, it is classified as scenery |
| 14 Snow | Where a ridge is viewed; | If ambiguous, it is classified as scenery |
| 15 Waterfall | STREET, City bird view, Skyscraper | |
| 16 Waterside | If water areas such as lakes and rivers are widely distributed, if only water areas exist, they are not included. | |
| 17 Scenery | Complex scenery | |
| 18 SMera data | Limited to stage | |
| 19 Vehicle | | |
| 20 Drink | | |
| 21 Flower | If there is a flower area of 25% or more, or if there is no morphological feature, it is classified as scenery. | |
| 22 Tree | | If ambiguous, it is classified as greenery |
| 23 Greenery | Complex natural objects | |
| 24 Animal | | The size of the animal area should be at least 25% of the image |
| 25 Shoes | | |
| 26 Backlit | | |
| 27 Indoor(Home/Restaurant) | If there is an object that may be inferred as indoors, check the illuminance | |
| 28 Text(Document) | Square frame shapes, such as documents, pictures, business cards, books, etc. | Color correction for clear text, a guide to maintaining a square composition |
| 29 Clothing | body not including face | Reason why category is required |
| 30 Night view | If a light source such as a light, streetlamp, signboard, etc. is viewed, set the Night view auto block time zone as the time range | |
| 31 Low light | If Settings > Intelligent > Bright night shot ON, the category is enterable | |

Figure 3B:
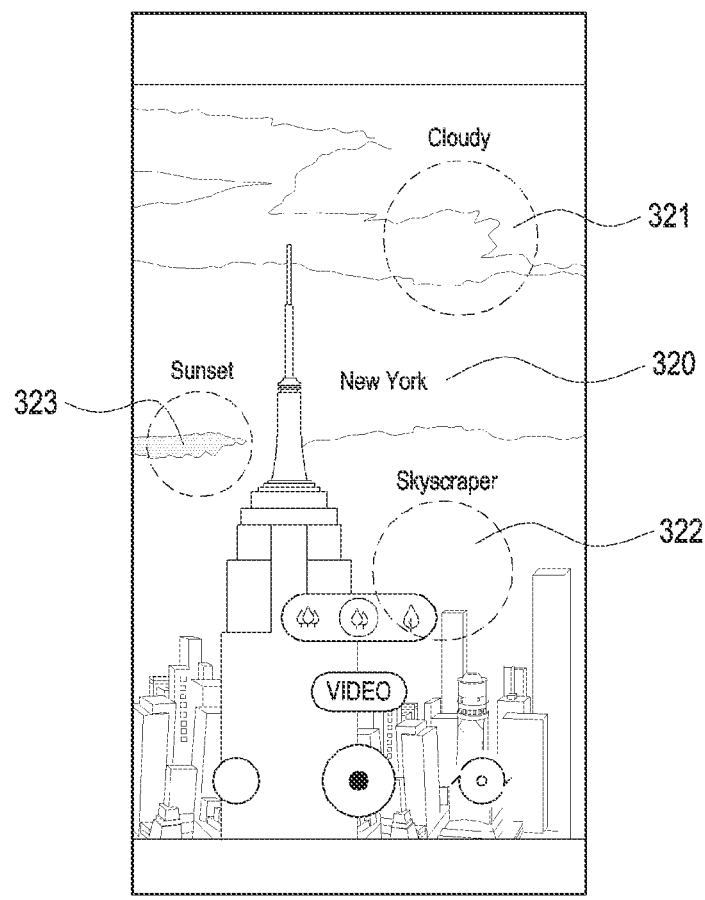
FIG. 3B is a view illustrating object information included in a live view image according to various embodiments.

According to various embodiments, as illustrated in FIG. 3B, the electronic device may display at least one piece of object information obtained from the live view image on the live view image.

FIG. 3B is a view illustrating object information included in a live view image according to various embodiments.

According to an embodiment, referring to FIG. 3B, the electronic device (e.g., the electronic device 101 or processor 120 of FIG. 1) may display at least one piece of object information 320, 321, 322, and 323 obtained from the live view image on the live view image.

For example, the electronic device may display, on the live view image, object information, New York, 320 obtained based on a specific building included in the live view image being a building in New York. In another embodiment, the electronic device may display, on the live view image, object information, cloudy, 321 obtained based on clouds included in the live view image. In another embodiment, the electronic device may display, on the live view image, object information, skyscraper, 322 obtained based on the skyscrapers included in the live view image. In another embodiment, the electronic device may display object information, sunset, 323 obtained based on the sunset included in the live view image on the live view image.

According to various embodiments, referring back to FIG. 2, the electronic device may obtain at least one feature text for the live view image based on the at least one piece of object information included in the live view image. According to various embodiments, the feature text may be referred to as a seed.

According to various embodiments, the electronic device may obtain at least one feature text by further considering (or based on) at least one of location information, date information, or time information about the electronic device where the live view image is obtained, as well as the object information included in the live view image. For example, while obtaining the live view image, the electronic device may obtain at least one feature text for the live view image by further considering location information about the electronic device obtained through a sensor (e.g., the sensor module 176 of FIG. 1 (e.g., a GPS sensor)). In another embodiment, while obtaining the live view image, the electronic device may obtain at least one feature text for the live view image by further considering at least one of location information, date information, or time information about the electronic device obtained from an external electronic device (e.g., a server or a beacon).

According to various embodiments, the electronic device may obtain at least one feature text for the live view image by further considering at least one of movement information, speed information, action information, live view image brightness information, or color information about the object included in the live view image. In another embodiment, while obtaining the live view image, the electronic device may obtain at least one feature text for the live view image by further considering at least one of movement information, speed information, or action information about the electronic device obtained through a sensor (e.g., a gyro sensor, an acceleration sensor, or a speed sensor).

According to various embodiments, in operation 230, the electronic device may display at least one feature text together with the live view image.

Figure 3C:
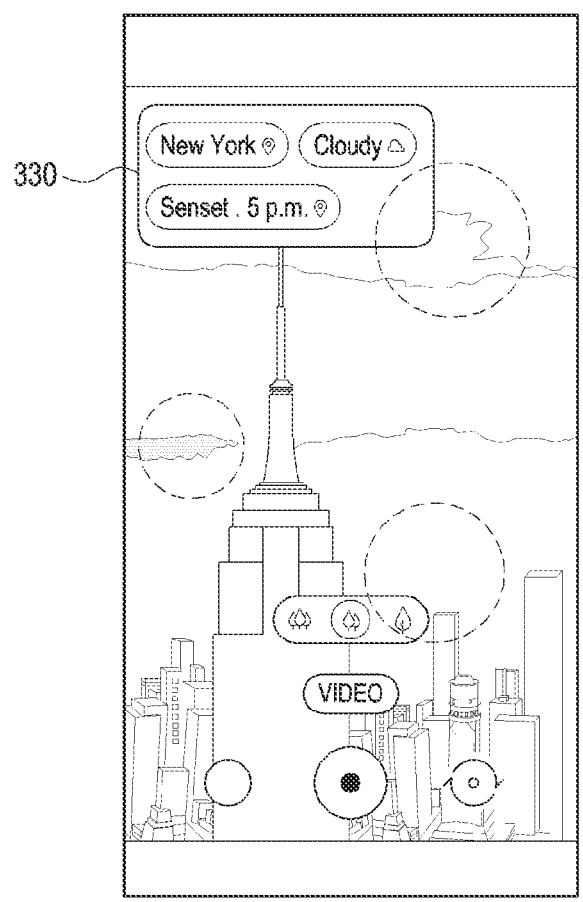
FIG. 3C is a view illustrating at least one feature text of a live view image according to various embodiments.

For example, as illustrated in FIG. 3C, the electronic device may display at least one feature text 330 for the live view image together with the live view image.

FIG. 3C is a view illustrating at least one feature text of a live view image according to various embodiments.

According to various embodiments, the electronic device may display a set number of feature texts together with a live view image. For example, when the obtained feature texts are more than the set number, the electronic device may display the set number of feature texts with a set criterion, together with the live view image. According to various embodiments, the set criterion may be a criterion input by the manufacturer or the user, and may be related to the priority of at least one feature text such as location priority, weather priority, and time priority.

According to various embodiments, as illustrated in FIG. 3C, the electronic device may delete the object information illustrated in FIG. 3B and display at least one feature text 330 while displaying the object information in the live view image. Alternatively, the electronic device may maintain the display of the object information and display the at least one feature text.

According to various embodiments, referring back to FIG. 2, in operation 240, the electronic device may identify at least one sound source where metadata thereof matches at least one feature text among the plurality of sound sources.

According to various embodiments, a plurality of sound sources may be stored in a memory (e.g., the memory 130 of FIG. 1) or may be obtained from a sound source application. For example, a sound source stored in the memory may be stored by the user or may be a free licensed sound source stored by the manufacturer. According to various embodiments, the sound source stored in the memory may also be controlled through the sound source application embedded in the electronic device.

According to various embodiments, each of the plurality of sound sources may include at least one piece of metadata, and may be classified based on the metadata. According to various embodiments, the metadata may be input by the sound source provider or may be assigned based on other information, e.g., the lyrics, of the sound source.

For example, the sound source application may classify categories such as the genre, situation, emotion, style, weather, season, and era of the sound source, and may classify a plurality of sound sources based on the metadata assigned to each sound source within each category. For example, for the genre of the sound source, the plurality of sound sources may be classified based on the metadata that is at least one piece of information such as pop, ballad, dance, R&B, pop, hip hop, electronica, classical music, and jazz, which are assigned to each sound source. According to another embodiment, for the emotion of the sound source, the plurality of sound sources may be classified based on the metadata that is at least one piece of information such as loneliness, pleasure, sadness, mood change, afternoon, dawn, evening, excitement, joy, and celebration, which are assigned to each sound source.

According to various embodiments, the electronic device may compare at least one feature text obtained for the live view image with metadata of the plurality of sound sources, and identify at least one sound source in which the metadata and the feature text match each other among the plurality of sound sources.

An operation of identifying at least one sound source by matching the feature text with metadata of the sound source according to various embodiments is described below with reference to FIGS. 8A to 8C.

According to various embodiments, the electronic device may generate a sound source list including at least one identified sound source among the plurality of sound sources, based on a similarity between at least one feature text for the live view image and metadata of the sound source. For example, the similarity may be determined based on at least one of the number of metadata of the sound source matching the at least one feature text or the priority of the category including the metadata matching the at least one feature text.

According to various embodiments, the electronic device may identify the sound source having the highest similarity among the at least one sound source identified based on the at least one feature text for the live view image as a first sound source.

According to various embodiments, referring back to FIG. 2, in operation 250, the electronic device may display information about a sound source together with the live view image. For example, as illustrated in FIG. 3D, the electronic device may display information 340 about the first sound source together with the live view image.

Figure 3D:
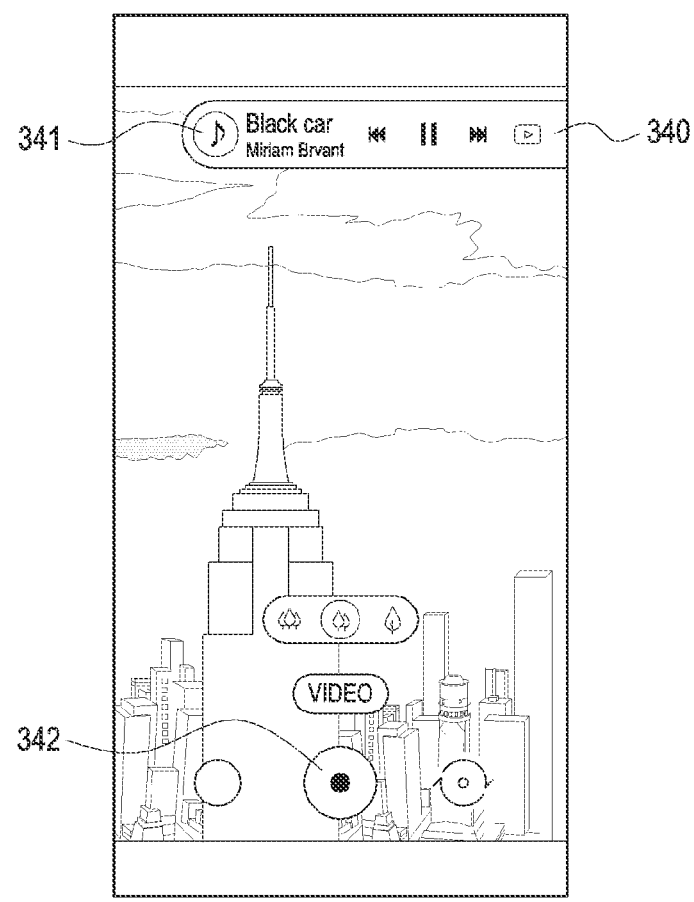
FIG. 3D is a view illustrating sound source information identified based on a live view image according to various embodiments.

FIG. 3D is a view illustrating sound source information identified based on a live view image according to various embodiments.

According to various embodiments, referring to FIG. 3D, the electronic device (e.g., the electronic device 101 or the processor 120 of FIG. 1) may further display a user interface for controlling the sound source application providing the first sound source with information 340 about the first sound source. Accordingly, the electronic device may control the sound source application while executing the camera application.

According to various embodiments, the electronic device may further display an interface 341 for displaying a sound source list together with information 340 about the first sound source.

According to various embodiments, when a user manipulation for displaying the sound source list is input, the electronic device may display the sound source list together with the live view image. For example, when a user manipulation is input through the interface 341 for displaying the sound source list, the electronic device may display the sound source list 410 as illustrated in FIG. 4.

Figure 4:
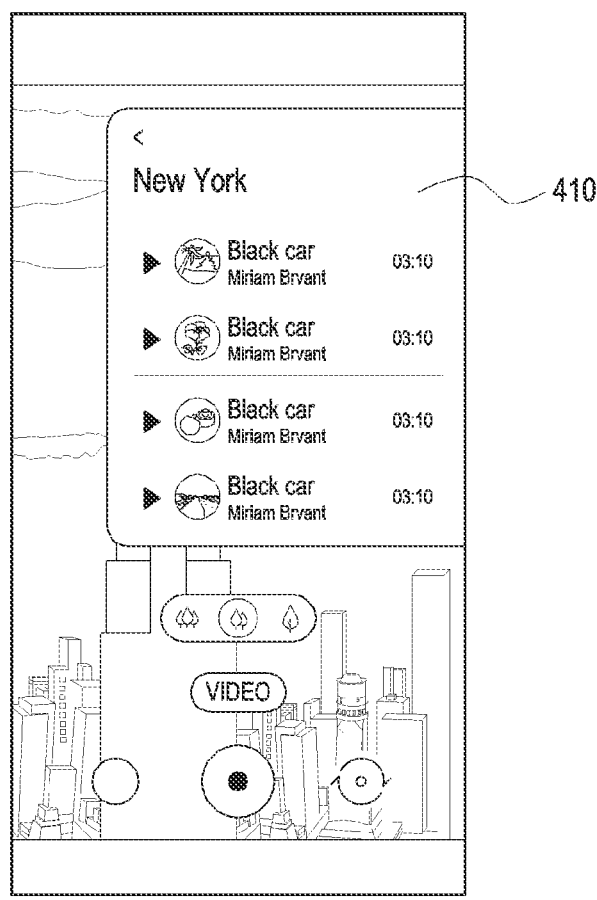
FIG. 4 is a view illustrating a sound source list according to various embodiments.

FIG. 4 is a view illustrating a sound source list according to various embodiments.

According to various embodiments, referring to FIG. 4, an electronic device (e.g., the electronic device or the processor 120 of FIG. 1) may display at least one sound source list 410 identified based on at least one feature text for a live view image. According to various embodiments, at least one sound source may be provided by a same sound source application.

According to various embodiments, when a user manipulation of selecting a second sound source from the displayed sound source list 410 is input, the electronic device may change the first sound source to the second sound source. According to various embodiments, when a user manipulation for closing the sound source list 410 is input, the electronic device may display information about the second sound source together in the live view image.

According to various embodiments, the electronic device may further display an interface for displaying a list of sound source applications together with the information 340 about the sound source, and may change the sound source application based on a user manipulation input. An operation of changing a sound source application according to various embodiments is described below with reference to FIGS. 5A and 5B.

According to various embodiments, referring back to FIG. 2, in operation 260, when a user manipulation for taking a video is input, the electronic device may output one of the at least one sound source through the speaker and take a video.

Figure 3E:
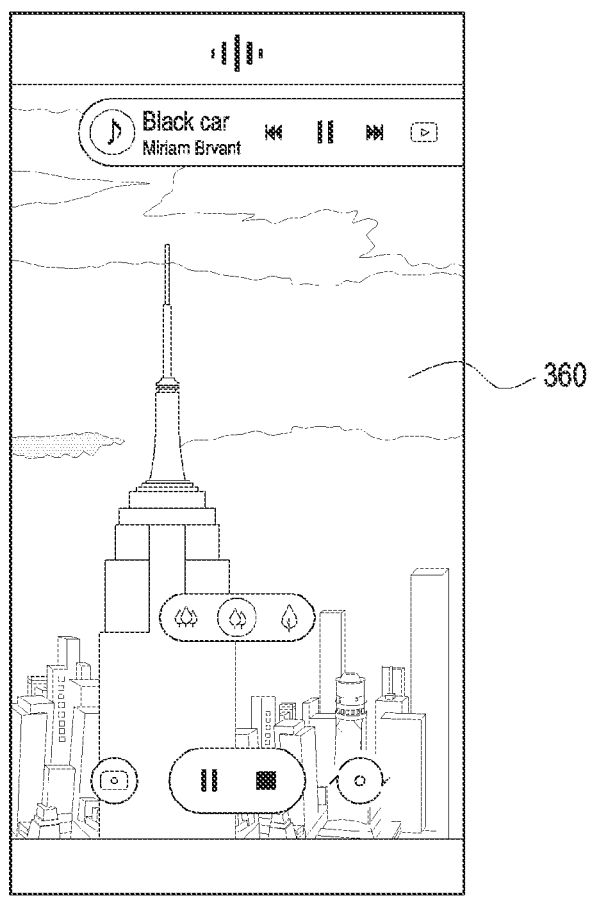
FIG. 3E is a view illustrating a video taking operation according to various embodiments.

According to various embodiments, when a user manipulation for video taking is input through the user interface 342 for video taking as illustrated in FIG. 3D, the electronic device may perform video taking as illustrated in FIG. 3E.

FIG. 3E is a view illustrating a video taking operation according to various embodiments.

According to various embodiments, referring to FIG. 3E, when a user manipulation for video taking is input, an electronic device (e.g., the electronic device 101 or the processor 120 of FIG. 1) may output a sound source through a speaker (e.g., the sound output module 155 of FIG. 1) and may take a video through a microphone (e.g., the input module 150 of FIG. 1) and a camera (e.g., the camera module 180 of FIG. 1).

For example, the electronic device may output the sound source from the beginning or may reproduce the sound source from a highlight part. For example, the highlight part may be a playback start point selected by the user, or may be a section matched with the feature text for the live view image in the lyrics.

In an embodiment, as described above, the sound source may be output after the user manipulation input for video taking. However, according to various embodiments, the sound source may be output through the user interface for controlling the sound source application even before the user manipulation input for video taking.

According to various embodiments, since the electronic device takes a video through the camera, the generated video may not include at least one user interface displayed together in the live view image. According to various embodiments, sound source information may be displayed on the video by user setting.

According to various embodiments, if the magnitude of the sound signal other than the output sound source among the sounds obtained through the microphone during video taking is equal to or greater than a set value, the electronic device may decrease the volume of the sound source output during video taking.

According to various embodiments, if a pause manipulation is input through a user interface for controlling the sound source application displayed in the live view image during video taking, the electronic device may pause the output of the sound source and maintain video taking.

According to various embodiments, if the live view image is changed due to the movement or rotation of the electronic device or the appearance of a new subject, the electronic device may change at least one sound source for the live view image in real-time based on the changed live view image. For example, if the live view image is changed while the live view image is displayed, the electronic device may obtain at least one feature text based on at least one piece of object information, object movement information, brightness information, location information about the electronic device, date information, or time information included in the changed live view image, and may obtain at least one sound source based on the at least one feature text.

According to various embodiments, when video taking is complete, the electronic device may share the captured video on an SNS application. A video sharing operation according to various embodiments is described below with reference to FIGS. 6A and 6B.

According to various embodiments, the electronic device may analyze the association relationship between the at least one feature text and the reproduced sound source, based on the sound source reproduced by the user in the sound source list identified for the live view image, and may recommend a sound source reproduction list. For example, a weight may be assigned to the metadata of the sound source reproduced by the user, and when a similar live view image is displayed thereafter, it may be used for sound source identification.

According to various embodiments, weights may be assigned to metadata of the sound source frequently used for each user, the sound source frequently used by a plurality of users in a specific place, and the sound source frequently used by a plurality of users in a specific time range.

Figure 5A:
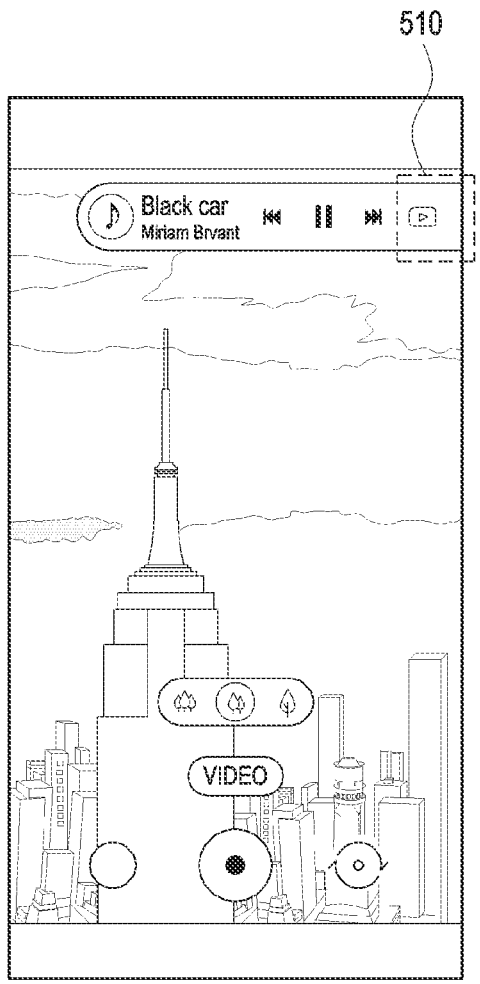
FIG. 5A is a view illustrating a sound source application change operation according to various embodiments.

FIG. 5A is a view illustrating a sound source application change operation according to various embodiments.

Figure 5B:
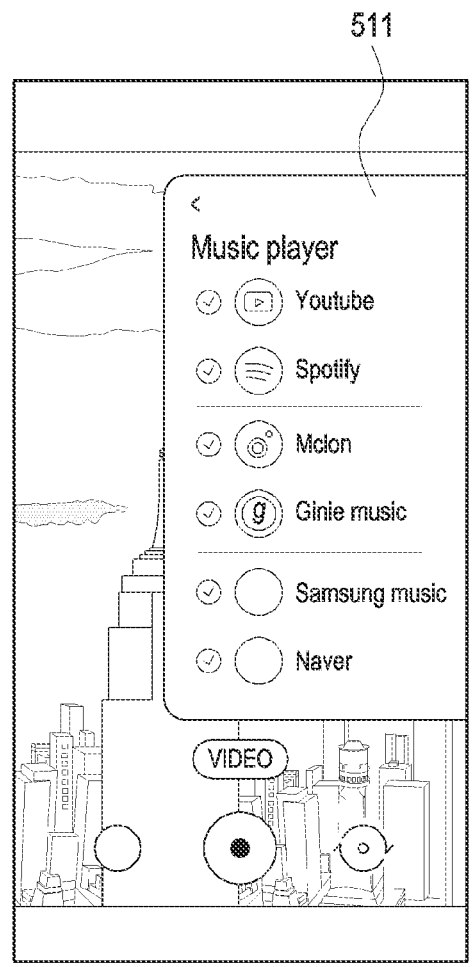
FIG. 5B is a view illustrating a sound source application change operation according to various embodiments.

FIG. 5B is a view illustrating a sound source application change operation according to various embodiments.

According to various embodiments, referring to FIG. 5A, the electronic device (e.g., the electronic device 101 or the processor 120 of FIG. 1) may further display a user interface 510 for changing a sound source application together with information about the identified sound source.

According to various embodiments, if the user selects the user interface 510 for changing the sound source application, the electronic device may display an available sound source application list 511 as illustrated in FIG. 5B.

According to various embodiments, the electronic device may identify the priority between sound source applications in the sound source application list 511 based on the recently used sound source application. In another embodiment, when the sound source application for controlling the sound source stored in the memory is included in the recently used sound source applications, the electronic device may identify the sound source application for controlling the sound source stored in the memory as having a high priority.

According to various embodiments, if there is no sound source application used for a recent predetermined period, the electronic device may identify the priority based on the name of the sound source application.

According to various embodiments, when there is no sound source application linked to the external server, the electronic device may display the embedded sound source application in the sound source application list 511, and may further display an interface for leading to download of the sound source application linked to the external server.

According to various embodiments, if a user manipulation for changing a sound source application is input through the sound source application list 511, the electronic device may re-identify at least one sound source in which the metadata and feature text for the live view image match each other among the plurality of sound sources in the changed sound source application.

Figure 6A:
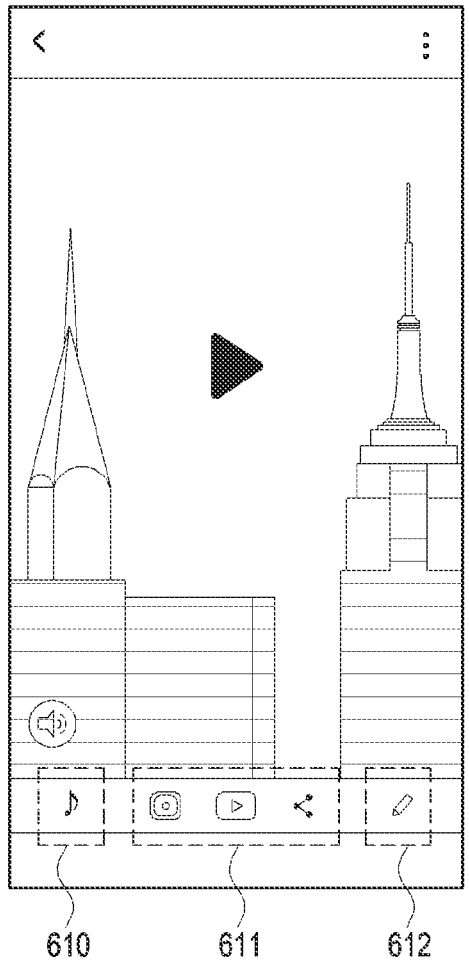
FIG. 6A is a view illustrating a share operation or an edit operation after taking a video according to various embodiments.

FIG. 6A is a view illustrating a share operation or an edit operation after taking a video according to various embodiments.

Figure 6B:
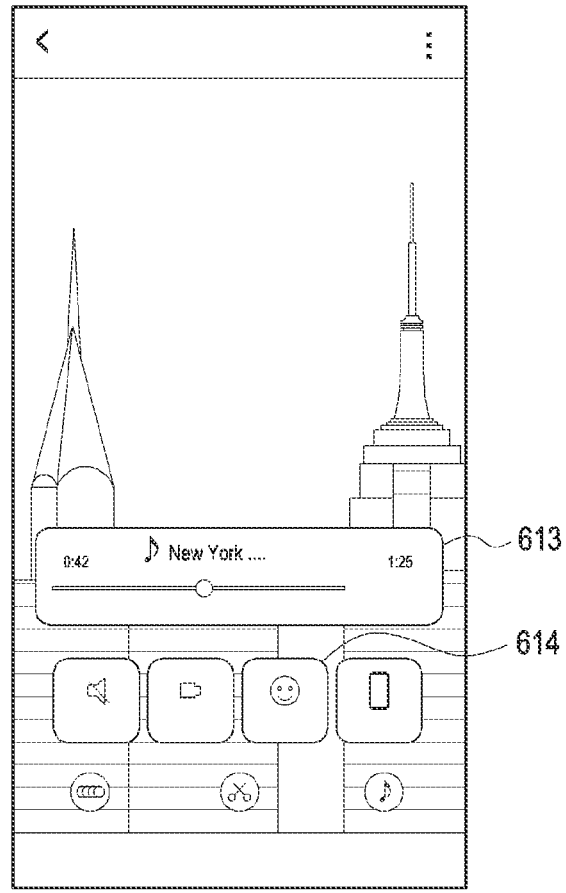
FIG. 6B is a view illustrating a share operation or an edit operation after taking a video according to various embodiments.

FIG. 6B is a view illustrating a share operation or an edit operation after taking a video according to various embodiments.

According to various embodiments, referring to FIG. 6A, if video taking is complete, the electronic device (e.g., the electronic device 101 or the processor 120 of FIG. 1) may display at least one of a user interface 610 for moving to the sound source application, a user interface 611 for video sharing, or a user interface 612 for video editing.

According to various embodiments, if a user manipulation for sharing is input through the user interface 611 for video sharing, the electronic device may share the video through the selected application. For example, the application selected for sharing may be a social networking service (SNS) application, a messenger application, or an email application.

According to various embodiments, the electronic device may share the video by using at least one feature text used when identifying a sound source as a tag for the video.

According to various embodiments, if the user interface 612 for video editing is selected, the electronic device may display interfaces 613 and 614 for video editing, as illustrated in FIG. 6B. For example, the interface for video editing may include an interface 613 for changing the sound source included in the video, or an interface 614 for adjusting the volume of the sound source or the volume of a sound other than the sound source.

According to various embodiments, the electronic device may change the sound source after taking a video by the user manipulation, may perform editing to adjust the volume of the sound source or the sound other than the sound source, or may share the edited video.

Figure 7A:
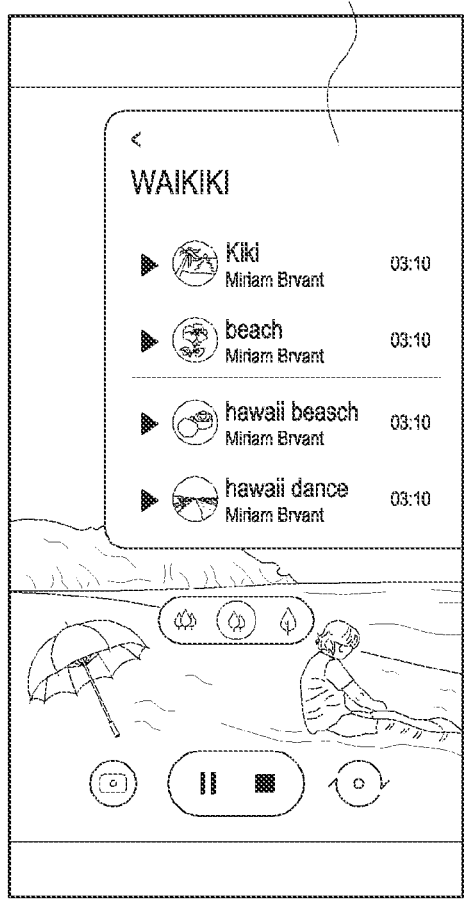
FIG. 7A is a view illustrating a sound source list provided based on information about a location where a live view image is obtained according to various embodiments.

FIG. 7A is a view illustrating a sound source list provided based on information about a location where a live view image is obtained according to various embodiments.

Figure 7B:
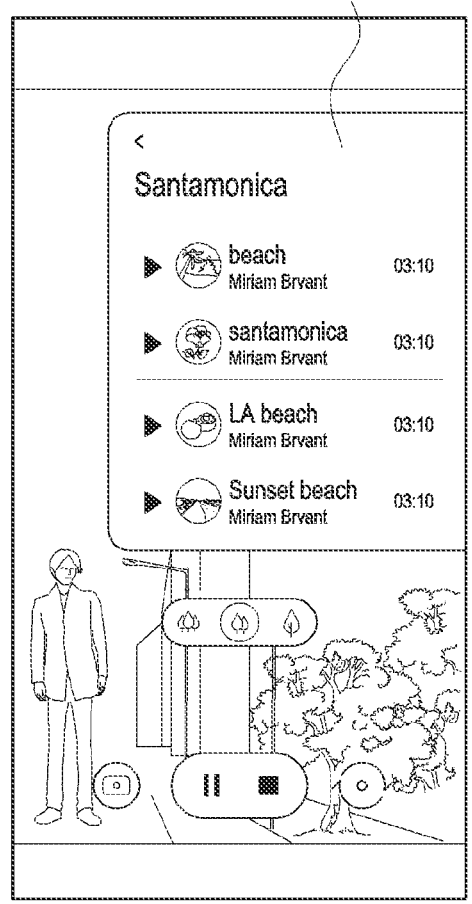
FIG. 7B is a view illustrating a sound source list provided based on information about another location where a live view image is obtained according to various embodiments.

FIG. 7B is a view illustrating a sound source list provided based on information about another location where a live view image is obtained according to various embodiments.

According to various embodiments, FIG. 7A illustrates a sound source list 710 provided when a video is taken at Waikiki Beach, and FIG. 7B illustrates a sound source list 711 provided when a video is taken at Santa Monica Beach.

According to various embodiments, referring to FIGS. 7A and 7B, an electronic device (e.g., the electronic device 101 or the processor 120 of FIG. 1) may recommend different sound sources using information (e.g., GPS sensor information) other than the live view image, even if at least one of place information (e.g., beach), time information, or weather information obtained through live view image analysis is the same as each other.

Figure 8A:
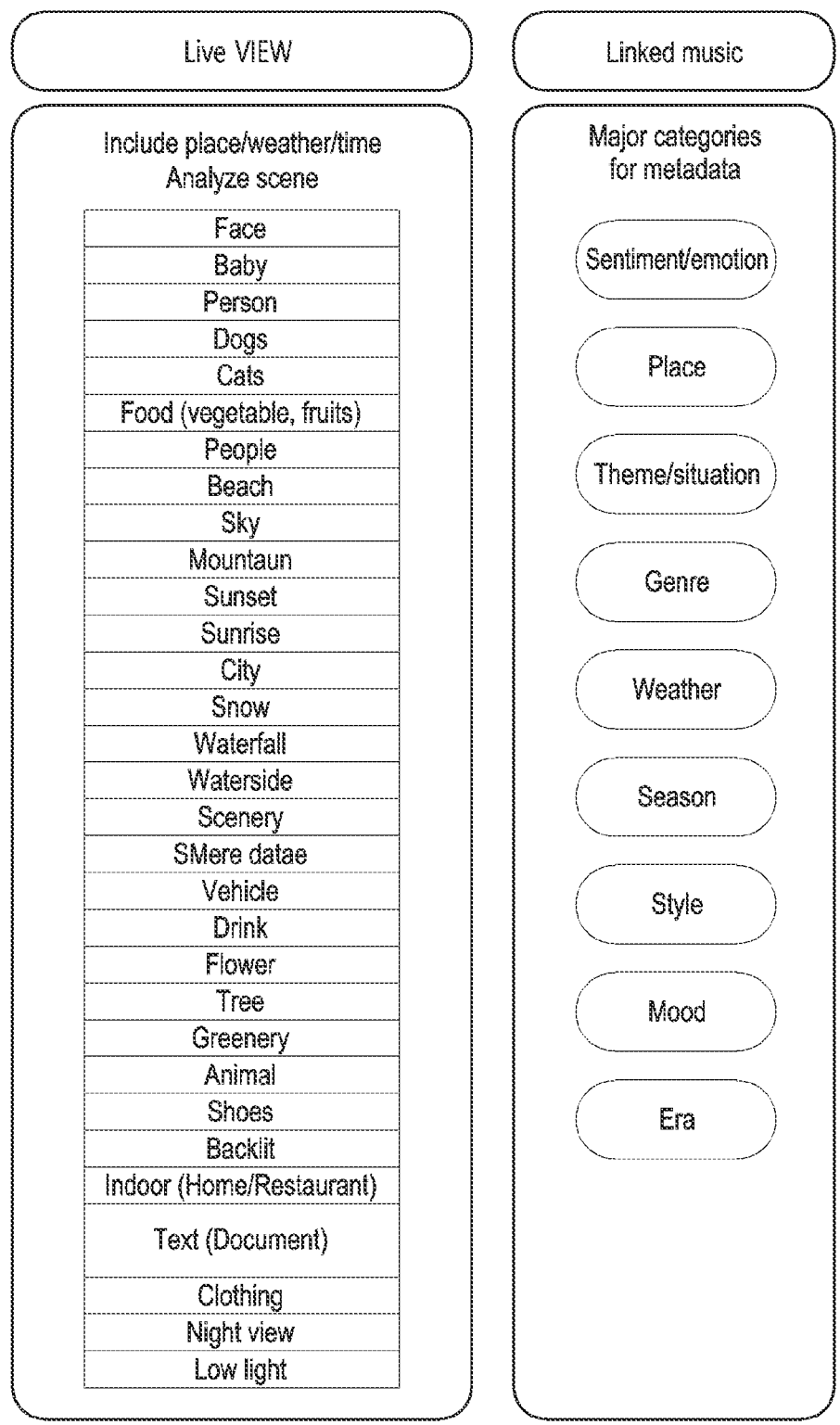
FIG. 8A is a view illustrating an operation of matching a feature of a live view image and metadata of a sound source according to various embodiments.

FIG. 8A is a view illustrating an operation of matching a feature of a live view image and metadata of a sound source according to various embodiments. For example, FIG. 8A is a view for describing an operation of matching the metadata of a sound source based on an analysis result of a live view image.

According to various embodiments, an electronic device (e.g., the electronic device 101 or the processor 120 of FIG. 1) may obtain at least one feature text based on object information obtained through live view image analysis, and may identify at least one sound source by matching the obtained feature text with metadata.

According to various embodiments, referring to FIG. 8A, the sound source application may classify metadata into major categories and identify at least one sound source based on the priority of the major categories.

For example, the electronic device may prioritize metadata classified as sentiment/emotion over metadata classified as place and match the metadata with at least one feature text.

According to various embodiments, when a plurality of sound sources are identified through metadata included in the same major category, the electronic device may identify at least one sound source by further considering the popularity of the sound source.

Figure 8B:
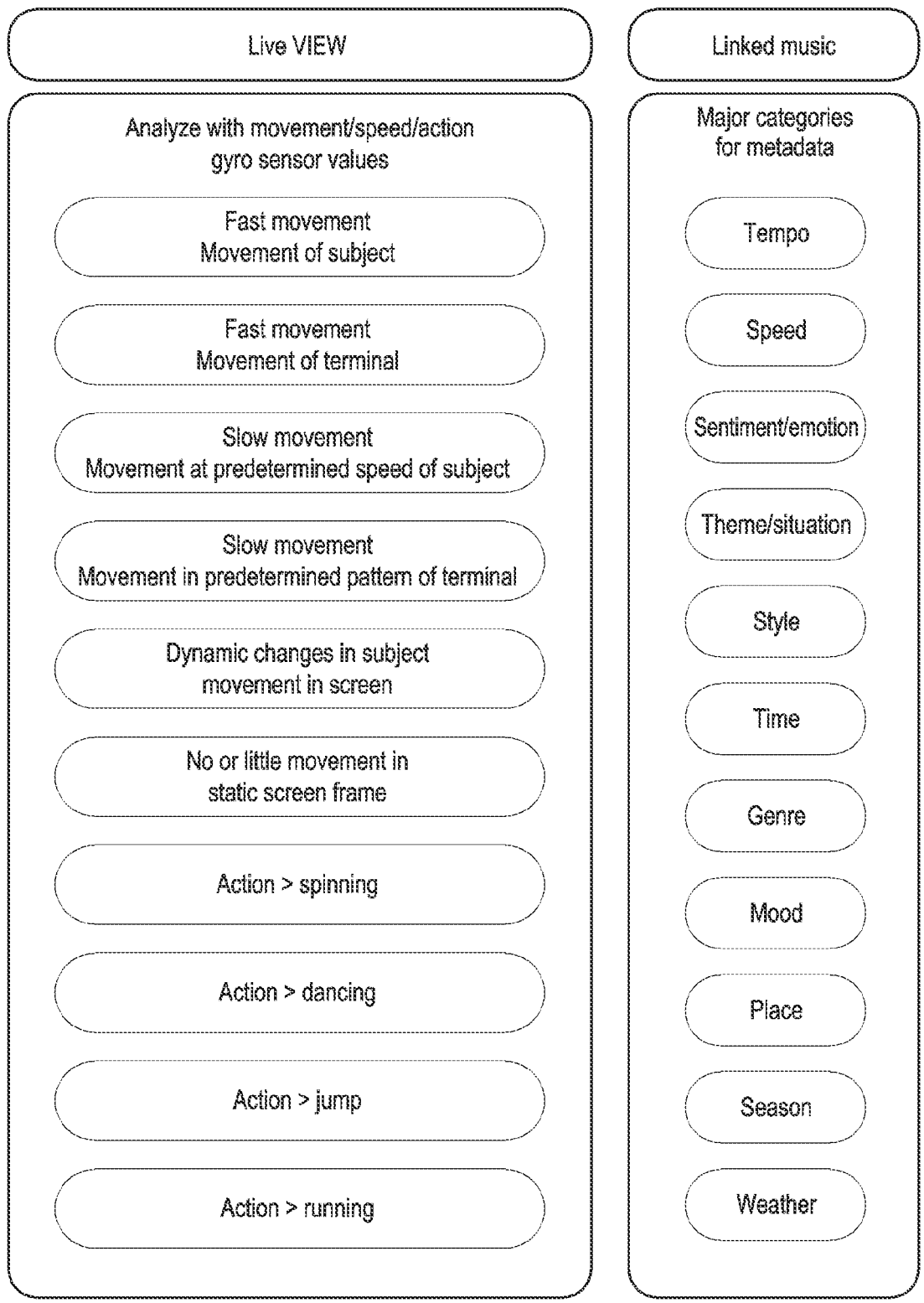
FIG. 8B is a view illustrating an operation of matching a feature of a live view image and metadata of a sound source according to various embodiments.

FIG. 8B is a view illustrating an operation of matching a feature of a live view image and metadata of a sound source according to various embodiments. For example, FIG. 8B is a view for describing an operation of matching metadata of a sound source based on at least one of movement information, speed information, or action information about the electronic device obtained based on a sensor (e.g., the sensor module 176 of FIG. 1).

According to various embodiments, the electronic device (e.g., the electronic device 101 or the processor 120 of FIG. 1) may obtain at least one feature text such as "fast movement, movement of subject" or "action>spinning" based on at least one of movement information, speed information, or action information about the electronic device obtained based on the sensor (e.g., the sensor module 176 of FIG. 1), and may identify at least one sound source by matching the obtained feature text with metadata.

According to various embodiments, referring to FIG. 8B, the sound source application may classify metadata into major categories and identify at least one sound source based on the priority of the major categories.

For example, the electronic device may prioritize metadata classified as tempo or speed over metadata classified as sentiment/emotion and match the metadata with at least one feature text.

According to various embodiments, when a plurality of sound sources are identified through metadata included in the same major category, the electronic device may identify at least one sound source by further considering the popularity of the sound source.

Figure 8C:
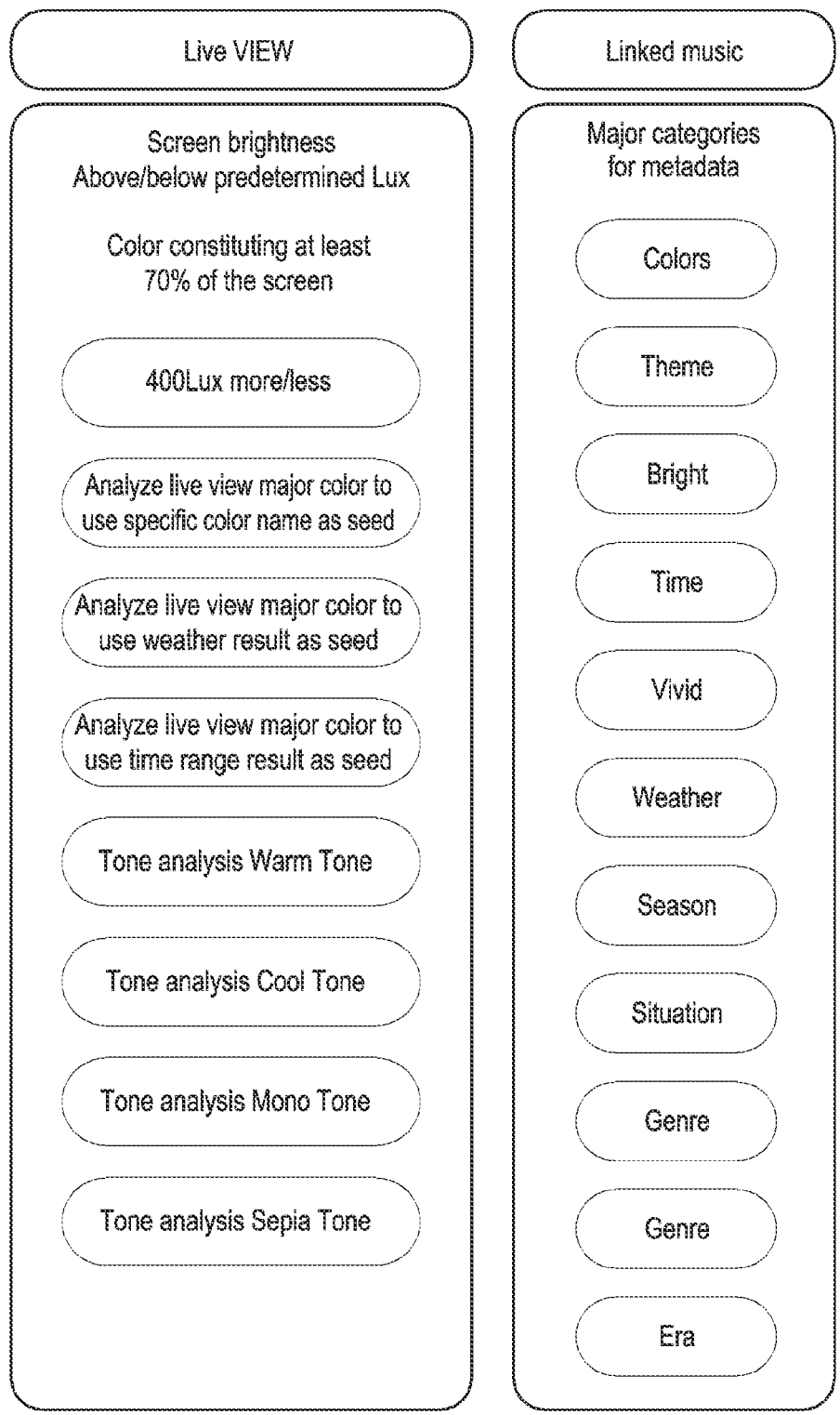
FIG. 8C is a view illustrating an operation of matching a feature of a live view image and metadata of a sound source according to various embodiments.

FIG. 8C is a view illustrating an operation of matching a feature of a live view image and metadata of a sound source according to various embodiments. For example, FIG. 8C is a view for describing an operation of matching the metadata of a sound source based on at least one of the brightness or color of the live view image.

According to various embodiments, the electronic device (e.g., the electronic device 101 or processor 120 of FIG. 1) may obtain at least one feature text such as "red" or "cool tone" based on at least one of the brightness or color of the live view image and match the obtained feature text with metadata to identify at least one sound source.

According to various embodiments, referring to FIG. 8C, the sound source application may classify metadata into major categories and identify at least one sound source based on the priority of the major categories.

For example, the electronic device may prioritize metadata classified as colors over metadata classified as brightness and match the metadata with at least one feature text.

According to various embodiments, when a plurality of sound sources are identified through metadata included in a same major category, the electronic device may identify at least one sound source by further considering the popularity of the sound source.

According to various embodiments, an electronic device (e.g., the electronic device 101 of FIG. 1) may include a microphone (e.g., the input module 150 of FIG. 1), a camera (e.g., the camera module 180 of FIG. 1), a display (e.g., the display module 160 of FIG. 1), a speaker (e.g., the sound output module 155 of FIG. 1), and at least one processor (e.g., the processor 120 of FIG. 1) operatively connected to the camera, the display, and the speaker. In such embodiments, the at least one processor may, if a camera application is executed, display a live view image obtained through the camera on the display, obtain at least one feature text for the live view image based on at least one piece of object information included in the live view image, display the at least one feature text with the live view image, identify at least one sound source in which metadata matches the at least one feature text among a plurality of sound sources, display information about the at least one sound source with the live view image, and if a user manipulation for video taking is input, output a first sound source among the at least one sound source through the speaker and take a video through the microphone and the camera.

According to various embodiments, the at least one processor may obtain the at least one feature text based on (or by further considering) at least one of location information, date information, or time information where the live view image is obtained.

According to various embodiments, the at least one processor may display the at least one piece of object information on the live view image.

According to various embodiments, the at least one processor may generate a sound source list including the at least one sound source based on a similarity between the at least one feature text and the metadata of the at least one sound source and identify a sound source having a highest similarity among the at least one sound source in the sound source list as the first sound source.

According to various embodiments, the at least one processor may, if a user manipulation for displaying the sound source list is input, display the sound source list with the live view image, and if a user manipulation for selecting a second sound source among the at least one sound source in the sound source list is input, change the first sound source into the second sound source.

According to various embodiments, the electronic device may further include a memory. In such embodiments, the at least one sound source may be stored in the memory or obtained through a sound source application.

According to various embodiments, the at least one processor may display a user interface for controlling the sound source application with the live view image.

According to various embodiments, the at least one processor may decrease a volume of the first sound source if a magnitude of a sound signal other than the first sound source among sounds obtained through the microphone while taking the video is greater than or equal to a set value.

According to various embodiments, the at least one processor may, if the live view image is changed, change, in real-time, the at least one sound source based on the changed live view image.

According to various embodiments, the at least one processor may, if the video taking is complete, display a user interface for sharing the taken video on an SNS application, and if a user manipulation for sharing is input through the user interface, share the taken video through the SNS application.

According to various embodiments, a method for controlling an electronic device may include, if a camera application is executed, displaying a live view image obtained through a camera on a display, obtaining at least one feature text for the live view image based on at least one piece of object information included in the live view image, displaying the at least one feature text with the live view image, identifying at least one sound source including metadata, which matches the at least one feature text, among a plurality of sound sources, displaying information about the at least one sound source with the live view image, and if a user manipulation for video taking is input, outputting a first sound source among the at least one sound source through a speaker and taking a video through a microphone and the camera.

According to various embodiments, the obtaining the at least one feature text may include obtaining the at least one feature text based on at least one of location information, date information, or time information where the live view image is obtained.

According to various embodiments, the method may further include displaying the at least one piece of object information on the live view image.

According to various embodiments, the identifying the at least one sound source may include generating a sound source list including the at least one sound source based on a similarity between the at least one feature text and the metadata of the at least one sound source and identifying a sound source having a highest similarity among the at least one sound source in the sound source list as the first sound source.

According to various embodiments, the method may further include, if a user manipulation for displaying the sound source list is input, displaying the sound source list with the live view image, and if a user manipulation for selecting a second sound source among the at least one sound source in the sound source list is input, changing the first sound source into the second sound source.

According to various embodiments, the at least one sound source may be stored in a memory of the electronic device or obtained through a sound source application.

According to various embodiments, the method may further include providing a user interface for controlling the sound source application with the live view image.

According to various embodiments, the method may further include decreasing a volume of the first sound source if a magnitude of a sound signal other than the first sound source among sounds obtained through the microphone while taking the video is greater than or equal to a set value.

According to various embodiments, the method may further include, if the live view image is changed, changing, in real-time, the at least one sound source based on the changed live view image.

According to various embodiments, the method may further include, if the video taking is complete, displaying a user interface for sharing the taken video on an SNS application, and if a user manipulation for sharing is input through the user interface, sharing the taken video through the SNS application.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
 a microphone;
 a camera;
 a display;
 a speaker;
 memory storing instructions; and
 at least one processor operatively connected to the camera, the display, the speaker, and the memory, wherein the instructions, when executed by the at least one processor, cause the electronic device to:
 display, based on a camera application being executed, a live view image obtained through the camera on the display;
 obtain at least one feature text for the live view image based on at least one piece of object information included in the live view image;
 display the obtained at least one feature text with the live view image;
 identify at least one sound source including metadata, which matches the at least one feature text, among a plurality of sound sources;
 display information about the identified at least one sound source with the live view image;
 output, based on a user manipulation for video taking being input, a sound of a first sound source among the at least one sound source through the speaker; and
 take a video through the microphone and the camera, while outputting the sound of the first sound source.

2. The electronic device of claim 1, wherein the instructions, when executed by the at least one processor, cause the electronic device to obtain the at least one feature text based on at least one of location information, date information, or time information where the live view image is obtained.

3. The electronic device of claim 1, wherein the instructions, when executed by the at least one processor, cause the electronic device to display the at least one piece of object information on the live view image.

4. The electronic device of claim 1, wherein the instructions, when executed by the at least one processor, cause the electronic device to:

generate a sound source list including the at least one sound source based on a similarity between the at least one feature text and the metadata of the at least one sound source; and identify a sound source having a highest similarity among the at least one sound source in the sound source list as the first sound source.

5. The electronic device of claim 4, wherein the instructions, when executed by the at least one processor, cause the electronic device to:

display, based on a user manipulation for displaying the sound source list is input, the sound source list with the live view image; and change, based on a user manipulation for selecting a second sound source among the at least one sound source in the sound source list is input, the first sound source into the second sound source.

6. The electronic device of claim 1, wherein the at least one sound source is stored in the memory or obtained through a sound source application.

7. The electronic device of claim 6, wherein the instructions, when executed by the at least one processor, cause the electronic device to display a user interface for controlling the sound source application with the live view image.

8. The electronic device of claim 1, wherein the instructions, when executed by the at least one processor, cause the electronic device to decrease a volume of the sound of the first sound source based on a magnitude of a sound other than the first sound source among sounds obtained through the microphone while taking the video being greater than or equal to a set value.

9. The electronic device of claim 1, wherein the instructions, when executed by the at least one processor, cause the electronic device to, change, based on the live view image being changed, change, in real-time, the at least one sound source based on the changed live view image.

10. The electronic device of claim 1, wherein the instructions, when executed by the at least one processor, cause the electronic device to:

display, based on the video taking being complete, a user interface for sharing the taken video on an SNS application; and share, based on a user manipulation for sharing being input through the user interface, the taken video through the SNS application.

11. A method for controlling an electronic device, the method comprising:

displaying, based on a camera application being executed, a live view image obtained through a camera on a display;

obtaining at least one feature text for the live view image based on at least one piece of object information included in the live view image;

displaying the obtained at least one feature text with the live view image;

identifying at least one sound source including metadata, which matches the at least one feature text, among a plurality of sound sources;

displaying information about the identified at least one sound source with the live view image;

outputting, based on a user manipulation for video taking being input, a sound of a first sound source among the at least one sound source through a speaker; and taking a video through a microphone and the camera, while outputting the sound of the first sound source.

12. The method of claim 11, wherein the obtaining the at least one feature text includes obtaining the at least one feature text based on at least one of location information, date information, or time information where the live view image is obtained.

13. The method of claim 11, further comprising:

displaying the at least one piece of object information on the live view image.

14. The method of claim 11, wherein the identifying the at least one sound source includes:

generating a sound source list including the at least one sound source based on a similarity between the at least one feature text and the metadata of the at least one sound source; and identifying a sound source having a highest similarity among the at least one sound source in the sound source list as the first sound source.

15. The method of claim 14, further comprising:

displaying, based on a user manipulation for displaying the sound source list being input, the sound source list with the live view image; and changing, based on a user manipulation for selecting a second sound source among the at least one sound source in the sound source list being input, the first sound source into the second sound source.

16. The method of claim 11, wherein the at least one sound source is stored in a memory of the electronic device or obtained through a sound source application.

17. The method of claim 16, further comprising displaying a user interface for controlling the sound source application with the live view image.

18. The method of claim 11, further comprising decreasing a volume of the sound of the first sound source based on a magnitude of a sound other than the first sound source among sounds obtained through the microphone while taking the video being greater than or equal to a set value.

19. The method of claim 11, further comprising changing, based on the live view image being changed, in real-time, the at least one sound source based on the changed live view image.

20. The method of claim 11, further comprising:

displaying, based on the video taking being complete, a user interface for sharing the taken video on an SNS application; and sharing, based on a user manipulation for sharing being input through the user interface, the taken video through the SNS application.

* * * * *